(12) United States Patent
Lee et al.

(10) Patent No.: US 12,545,286 B2
(45) Date of Patent: Feb. 10, 2026

(54) METHOD FOR LOCATING SPECIFIC AUTONOMOUS VEHICLE AND COMPUTING DEVICE USING THE SAME

(71) Applicant: Autonomous A2Z, Gyeongsan si (KR)

(72) Inventors: Kang Hoon Lee, Suwon-si (KR); Ick Hwan Kwon, Daegu (KR); Ji Hyeong Han, Anyang si (KR)

(73) Assignee: Autonomous A2Z, Gyeongsan si (KR)

( * ) Notice: Subject to any disclaimer, the term of this patent is extended or adjusted under 35 U.S.C. 154(b) by 181 days.

(21) Appl. No.: 18/384,530

(22) Filed: Oct. 27, 2023

(65) Prior Publication Data

US 2025/0074452 A1   Mar. 6, 2025

(30) Foreign Application Priority Data

Aug. 30, 2023  (KR) .................. 10-2023-0114582

(51) Int. Cl.
*B60W 60/00*      (2020.01)
(52) U.S. Cl.
CPC ....... *B60W 60/001* (2020.02); *B60W 2556/40* (2020.02); *B60W 2556/45* (2020.02)
(58) Field of Classification Search
CPC ........... B60W 60/001; B60W 2556/40; B60W 2556/45
See application file for complete search history.

(56) References Cited

U.S. PATENT DOCUMENTS 9,373,149 B2 *   6/2016  Abhyanker ............ G06Q 10/10
11,480,435 B2   10/2022  Li et al.
2014/0136414 A1 *  5/2014  Abhyanker ........ G06Q 20/3224
                                                   701/25
2020/0124725 A1   4/2020  Qiu et al.

FOREIGN PATENT DOCUMENTS

| CN | 119078812 A | * 12/2024 | ............ B60W 10/20 |
| JP | 2009-20014 | 1/2009 | |
| JP | 2014-134469 | 7/2014 | |
| JP | 7260064 | 12/2021 | |
| WO | WO-2019000417 A1 | * 1/2019 | ........... G08G 1/0112 |

OTHER PUBLICATIONS

JP 2024-113627, Office Action, Issued Oct. 17, 2024.
Extended European Search Report cited in corresponding European Application No. 23205396.7 dated Apr. 17, 2024 11 pages.

* cited by examiner

*Primary Examiner* — Peter D Nolan
*Assistant Examiner* — Matthew Cobb
(74) *Attorney, Agent, or Firm* — Rimon Law, P.C.

(57) ABSTRACT

A method for locating a specific autonomous vehicle is provided. The method includes steps of: (a) receiving, by a computing device of the specific autonomous vehicle, map data related to a position of the specific autonomous vehicle and its adjacent regions, from a server; (b) obtaining, by the computing device, a specific object-based sector and a specific vehicle-based sector; and (c) determining, by the computing device, a validity of the specific sensed data by referring to the specific object-based sector, the specific vehicle-based sector and the map object data, and in case the specific sensed data is determined as valid, locating the specific autonomous vehicle by referring to a specific matched result data generated from a matching process between the map object data and the specific sensed data.

18 Claims, 7 Drawing Sheets

METHOD FOR LOCATING SPECIFIC AUTONOMOUS VEHICLE AND COMPUTING DEVICE USING THE SAME

CROSS REFERENCE OF RELATED APPLICATION

This present application claims the benefit of the earlier filing date of Korean non-provisional patent application No. 10-2023-0114582, filed on Aug. 30, 2023, the entire contents of which being incorporated herein by reference.

FIELD OF THE DISCLOSURE

The present disclosure relates to a method for locating a specific autonomous vehicle and a computing device using the same. More specifically, the present disclosure relates to a method of accurately locating the specific autonomous vehicle even in case there is a curve or a slope on a road which leads to a discrepancy between the sensed object data obtained by the specific autonomous vehicle and the stored object data on the map data, and the computing device using the same.

BACKGROUND OF THE DISCLOSURE

Recently, in order to allow a safe driving and enhance convenience of a driver, autonomous driving technologies can allow an autonomous vehicle to recognize any hazard from driving environment and to plan driving routes without driver's direct steering.

Generally, a map used for driving the autonomous vehicle is a top view map. To enhance an efficiency of generating the top view map, 3-dimensional objects such as buildings, walls etc. are represented as lines in the top view map. Herein, if there is a slope in the road or in the 3-dimensional object, i.e., not perpendicular to the ground, a discrepancy between the sensed data by the autonomous vehicle and the 3-dimensional object data stored in the top view map. This discrepancy may lead to inaccurate locating of the autonomous vehicle.

If such inaccurate locating occurs, an estimated position of the autonomous vehicle may be inaccurately mapped onto the top view map. Thus, a driving path mapped onto the top view map may be different from an actual driving path of the autonomous vehicle. Herein, the driving path mapped onto the top view map may lead the autonomous vehicle to pass through wall as the actual driving path, thereby increasing a possibility of an traffic accident of the autonomous vehicle.

For these reasons, a method of accurately locating the autonomous vehicle is needed even in case there is a slope on the road or in the 3-dimensional object.

SUMMARY OF THE DISCLOSURE

It is an object of the present disclosure to solve all the aforementioned problems.

It is another object of the present disclosure to obtain a specific object-based sector and a specific vehicle-based sector by referring to (i) map object data regarding at least one object included in the map data and (ii) specific sensed data obtained from a specific sensor of a specific autonomous vehicle and to determine a validity of the specific sensed data by using the specific object-based sector and the specific vehicle-based sector, to thereby locate the specific autonomous vehicle.

It is still another object of the present disclosure to locate the specific autonomous vehicle with a 1-st weight set as lower than a 2-nd weight in case a specific matched data error, obtained by referring to a difference between the specific sensed data and the map object data, is determined as being larger than a 2-nd threshold, and locate the specific autonomous vehicle with the 1-st weight set as larger than the 2-nd weight in case the specific matched data error is determined as being equal to or smaller than the 2-nd threshold, under a circumstance that a previous accumulated time, obtained by referring to a total time taken to obtain previous sensed data by a previous vehicle(s) for a specific pair comprised of the specific object-based sector and the specific vehicle-based sector, is sufficient wherein the 1-st weight is a weight assigned to the specific matched result data and the 2-nd weight is a weight assigned to specific previous calibration value.

In accordance with one aspect of the present disclosure, there is provided a method for locating a specific autonomous vehicle, comprising steps of: (a) receiving, by a computing device of the specific autonomous vehicle, map data related to a position of the specific autonomous vehicle and its adjacent regions, from a server; (b) obtaining, by the computing device, a specific object-based sector and a specific vehicle-based sector, by referring to (i) map object data regarding at least one object included in the map data and (ii) specific sensed data obtained from a specific sensor of the specific autonomous vehicle, wherein the specific object-based sector is a specific object-based virtual area, corresponding to a direction seen from the object toward the position of the specific autonomous vehicle and its adjacent directions, selected among all object-based virtual areas, and wherein the specific vehicle-based sector is a specific vehicle-based virtual area, corresponding to a headed direction of the specific autonomous vehicle and its adjacent directions, among all vehicle-based virtual areas; and (c) determining, by the computing device, a validity of the specific sensed data by referring to the specific object-based sector, the specific vehicle-based sector and the map object data, and in case the specific sensed data is determined as valid, locating the specific autonomous vehicle by referring to a specific matched result data generated from a matching process between the map object data and the specific sensed data.

As one example, at the step of (c), the computing device determines the validity of the specific sensed data by further referring to (i) a specific minimum measured height and a specific maximum measured height of the object, measured by the specific sensor of the specific autonomous vehicle and (ii) a specific minimum measured distance and a specific maximum measured distance between the specific autonomous vehicle and the object, measured by the specific sensor of the specific autonomous vehicle, and wherein (i) the specific minimum measured height and the specific maximum measured height of the object and (ii) the specific minimum measured distance and the specific maximum measured distance between the specific autonomous vehicle and the object correspond to a specific pair comprised of the specific object-based sector and the specific vehicle-based sector.

As one example, before the step of (a), further comprising a step of: (a0) generating a 1-st object-based sector to an n-th object-based sector by assigning each of unit areas for each of directional ranges based on the object, and generating a 1-st vehicle-based sector to an m-th vehicle-based sector by assigning each of unit areas for each of directional ranges based on each of points on a road where the specific autonomous vehicle has a possibility of being located during a driving of the specific autonomous vehicle, wherein, at the step of (b), one of the 1-st object-based sector to the n-th object-based sector is determined as the specific object-based sector by referring to the direction seen from the object toward the position of the specific autonomous vehicle, and one of the 1-st vehicle-based sector to the m-th vehicle-based sector is determined as the specific vehicle-based sector by referring to the position of the specific autonomous vehicle and the headed direction of the specific autonomous vehicle.

As one example, before the step of (a), further comprising steps of: (a1) taking all combinations by selecting each one among the 1-st object-based sector to the n-th object-based sector and selecting each one among the 1-st vehicle-based sector to the m-th vehicle-based sector, thereby generating n×m pairs including a (1_1)-st pair to an (n_m)-th pair, and (a2) storing previous matched data by correlating each of the previous matched data, between the object and multiple previous vehicles driven within a certain distance from the object, with each of the (1_1)-st pair to the (n_m)-th pair.

As one example, at the step of (c), the validity of the specific sensed data is determined by further referring to specific previous matched data, corresponding to a specific point on the road and matching to the position and the headed direction of the specific autonomous vehicle, among the previous matched data obtained from the multiple previous vehicles.

As one example, at the step of (c), the computing device receives at least one specific previous calibration value generated by referring to the specific previous matched data from the server, and locating the specific autonomous vehicle by referring to the previous matched data and the previous calibration value.

As one example, at the step of (c), in case a previous accumulated time, obtained by referring to a total time taken to obtain previous sensed data by the previous vehicle under a condition of a specific pair comprised of the specific object-based sector and the specific vehicle-based sector, is determined to be smaller than a 1-st threshold, the computing device locates the specific autonomous vehicle without an adjustment of the specific matched result data.

As one example, at the step of (c), in case a previous accumulated time, obtained by referring to a total time taken to obtain previous sensed data by the previous vehicle under a condition of a specific pair comprised of the specific object-based sector and the specific vehicle-based sector, is determined to be larger than or equal to a 1-st threshold and in case a specific matched data error, obtained by referring to a difference between the specific sensed data and the map object data, is determined as being larger than a 2-nd threshold, the computing device determines that the object is not recognizable for the specific pair comprised of the specific object-based sector and the specific vehicle-based sector, and locates the specific autonomous vehicle without a transmission of the specific matched result data to the server.

As one example, at the step of (c), on condition that a previous accumulated time, obtained by referring to the total time taken to obtain previous sensed data by the previous vehicle under the condition of the specific pair comprised of the specific object-based sector and the specific vehicle-based sector, is determined to be larger than or equal to the 1-st threshold, (i) in case the specific matched data error, obtained by referring to the difference between the specific sensed data and the map object data, is determined as being larger than a 3-rd threshold and smaller than or equal to the 2-nd threshold, the computing device locates the specific autonomous vehicle with a 1-st weight set as lower than a 2-nd weight, and (ii) in case the specific matched data error is equal or smaller than the 3-rd threshold, the computing device locates the specific autonomous vehicle with the 1-st weight set as higher than the 2-nd weight, wherein the 1-st weight is a weight assigned to the specific matched result data and the 2-nd weight is a weight assigned to the specific previous calibration value.

As one example, at the step of (c), the specific sensed data includes: (i) a specific minimum measured height and a specific maximum measured height of the object, measured by the specific sensor of the specific autonomous vehicle, (ii) a specific minimum measured distance and a specific maximum measured distance between the specific autonomous vehicle and the object, (iii) a specific time length which is a time section when the specific autonomous vehicle is located within a certain distance from the object, and (iv) a number of matched points between the specific sensor and the map object data.

In accordance with another aspect of the present disclosure, there is a computing device for locating a specific autonomous vehicle, comprising: at least one memory that stores instructions; and at least one processor configured to execute the instructions to perform or support another device to perform: (I) a process of receiving map data related to a position of the specific autonomous vehicle and its adjacent regions, from a server; (II) a process of obtaining a specific object-based sector and a specific vehicle-based sector, by referring to (i) map object data regarding at least one object included in the map data and (ii) specific sensed data obtained from a specific sensor of the specific autonomous vehicle, wherein the specific object-based sector is a specific object-based virtual area, corresponding to a direction seen from the object toward the position of the specific autonomous vehicle and its adjacent directions, selected among all object-based virtual areas, and wherein the specific vehicle-based sector is a specific vehicle-based virtual area, corresponding to a headed direction of the specific autonomous vehicle and its adjacent directions, among all vehicle-based virtual areas; and (III) a process of determining a validity of the specific sensed data by referring to the specific object-based sector, the specific vehicle-based sector and the map object data, and in case the specific sensed data is determined as valid, locating the specific autonomous vehicle by referring to a specific matched result data generated from a matching process between the map object data and the specific sensed data.

As one example, at the process of (III), the processor determines the validity of the specific sensed data by further referring to (i) a specific minimum measured height and a specific maximum measured height of the object, measured by the specific sensor of the specific autonomous vehicle and (ii) a specific minimum measured distance and a specific maximum measured distance between the specific autonomous vehicle and the object, measured by the specific sensor of the specific autonomous vehicle, and wherein (i) the specific minimum measured height and the specific maximum measured height of the object and (ii) the specific minimum measured distance and the specific maximum measured distance between the specific autonomous vehicle and the object correspond to a specific pair comprised of the specific object-based sector and the specific vehicle-based sector.

As one example, before the process of (I), further comprising a process of: (I0) generating a 1-st object-based sector to an n-th object-based sector by assigning each of unit areas for each of directional ranges based on the object, and generating a 1-st vehicle-based sector to an m-th vehicle-based sector by assigning each of unit areas for each of directional ranges based on each of points on a road where the specific autonomous vehicle has a possibility of being located during a driving of the specific autonomous vehicle, wherein, at the process of (II), one of the 1-st object-based sector to the n-th object-based sector is determined as the specific object-based sector by referring to the direction seen from the object toward the position of the specific autonomous vehicle, and one of the 1-st vehicle-based sector to the m-th vehicle-based sector is determined as the specific vehicle-based sector by referring to the position of the specific autonomous vehicle and the headed direction of the specific autonomous vehicle.

As one example, before the process of (I0), further comprising processes of: (I1) taking all combinations by selecting each one among the 1-st object-based sector to the n-th object-based sector and selecting each one among the 1-st vehicle-based sector to the m-th vehicle-based sector, thereby generating n×m pairs including a (1_1)-st pair to an (n_m)-th pair, and (I2) storing previous matched data by correlating each of the previous matched data, between the object and multiple previous vehicles driven within a certain distance from the object, with each of the (1_1)-st pair to the (n_m)-th pair.

As one example, at the process of (III), the validity of the specific sensed data is determined by further referring to specific previous matched data, corresponding to a specific point on the road and matching to the position and the headed direction of the specific autonomous vehicle, among the previous matched data obtained from the multiple previous vehicles.

As one example, at the process of (III), the processor receives at least one specific previous calibration value generated by referring to the specific previous matched data from the server, and locating the specific autonomous vehicle by referring to the previous matched data and the previous calibration value.

As one example, at the process of (III), in case a previous accumulated time, obtained by referring to a total time taken to obtain previous sensed data by the previous vehicle under a condition of a specific pair comprised of the specific object-based sector and the specific vehicle-based sector, is determined to be smaller than a 1-st threshold, the processor locates the specific autonomous vehicle without an adjustment of the specific matched result data.

As one example, at the process of (III), in case a previous accumulated time, obtained by referring to a total time taken to obtain previous sensed data by the previous vehicle under a condition of a specific pair comprised of the specific object-based sector and the specific vehicle-based sector, is determined to be larger than or equal to a 1-st threshold and in case a specific matched data error, obtained by referring to a difference between the specific sensed data and the map object data, is determined as being larger than a 2-nd threshold, the processor determines that the object is not recognizable for the specific pair comprised of the specific object-based sector and the specific vehicle-based sector, and locates the specific autonomous vehicle without a transmission of the specific matched result data to the server.

As one example, at the process of (III), on condition that a previous accumulated time, obtained by referring to the total time taken to obtain previous sensed data by the previous vehicle under the condition of the specific pair comprised of the specific object-based sector and the specific vehicle-based sector, is determined to be larger than or equal to the 1-st threshold, (i) in case the specific matched data error, obtained by referring to the difference between the specific sensed data and the map object data, is determined as being larger than a 3-rd threshold while smaller than or equal to the 2-nd threshold, the processor locates the specific autonomous vehicle with a 1-st weight set as lower than a 2-nd weight, and (ii) in case the specific matched data error is equal or smaller than the 3-rd threshold, the processor locates the specific autonomous vehicle with the 1-st weight set as higher than the 2-nd weight, wherein the 1-st weight is a weight assigned to the specific matched result data and the 2-nd weight is a weight assigned to the specific previous calibration value.

As one example, at the process of (III), the specific sensed data includes: (i) a specific minimum measured height and a specific maximum measured height of the object, measured by the specific sensor of the specific autonomous vehicle, (ii) a specific minimum measured distance and a specific maximum measured distance between the specific autonomous vehicle and the object, (iii) a specific time length which is a time section when the specific autonomous vehicle is located within a certain distance from the object, and (iv) a number of matched points between the specific sensor and the map object data.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
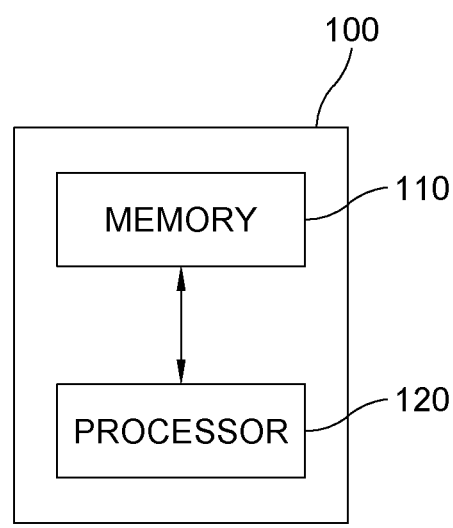
FIG. 1 is a schematically drawing illustrating a computing device for locating a specific autonomous vehicle in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

FIG. 1 is a drawing schematically illustrating a computing device 100 for locating a specific autonomous vehicle in accordance with one example embodiment of the present disclosure.

By referring to FIG. 1, the computing device 100 for locating the specific autonomous vehicle may include a memory 110 and a processor for locating the specific autonomous vehicle 120.

Specifically, the computing device 100 may include: a computer processor, a memory, a storage, an input device and an output device, and a device which may include components of the traditional computing device; an electrical communication device such as a router and a switch etc.; an electrical information storage system such as network attached storage (NAS) and storage area network (SAN) etc. Also, the computing device 100 may achieve a desired system performance by using computer software, i.e., instructions which function the computing device in a certain way.

And the processor 120 of the computing device 100 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the computing device 100 including an integrated processor which is an integrated form of the medium for performing the present disclosure, processor and memory.

The method for locating the specific autonomous vehicle using the computing device 100 is as follows:

Firstly, steps for locating the specific autonomous vehicle will be explained by referring to FIGS. 2 to 4.

Figure 2:
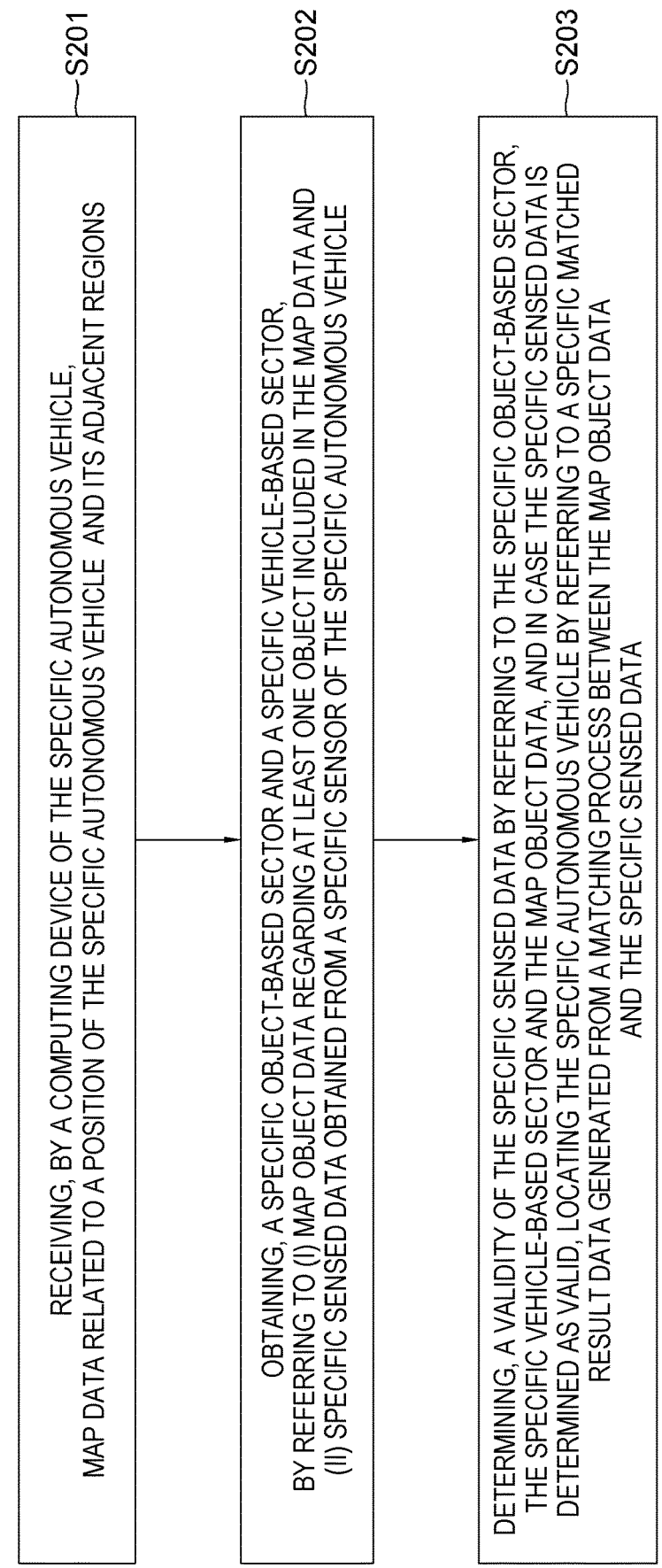
FIG. 2 is a flow chart schematically illustrating a method for locating the specific autonomous vehicle in accordance with one example embodiment of the present disclosure.
Figure 3:
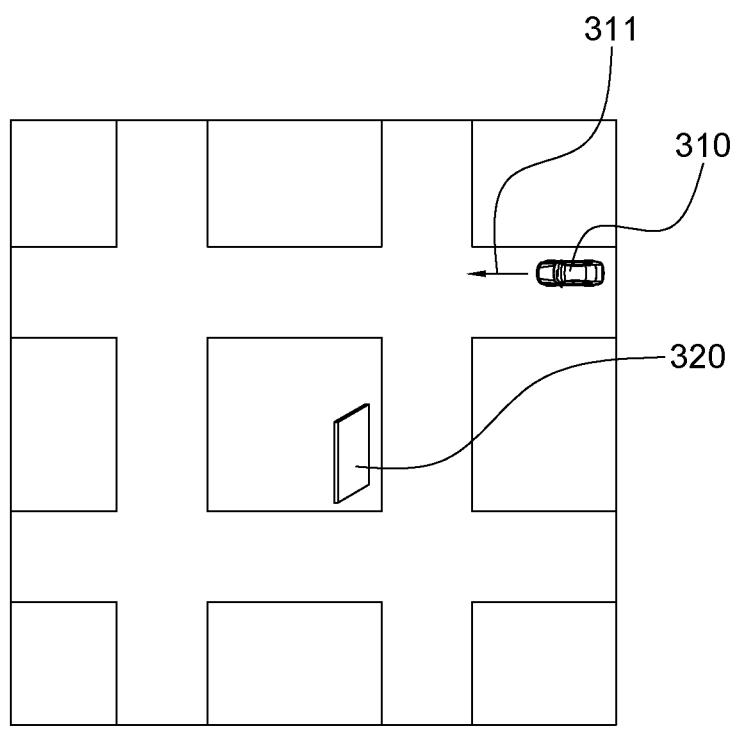
FIG. 3 is a drawing schematically illustrating the specific autonomous vehicle and an object within a certain distance from the specific autonomous vehicle in accordance with one example embodiment of the present disclosure.
Figure 4:
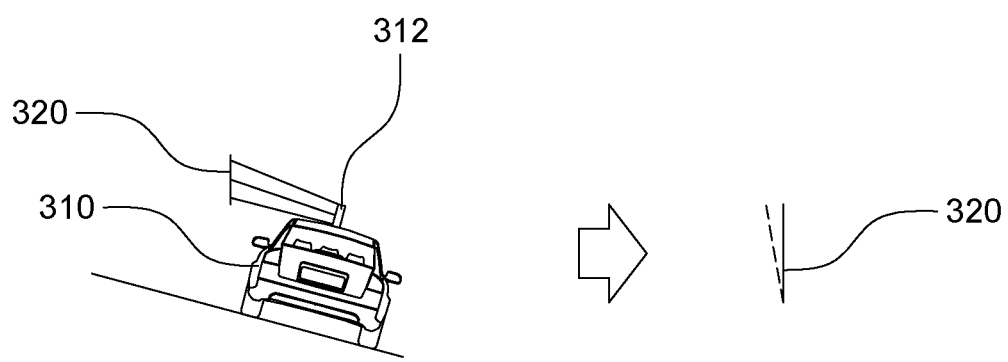
FIG. 4 is a drawing schematically illustrating a difference between specific sensed data and actual object data in case a road has a slope in the method for locating the specific autonomous vehicle in accordance with one example embodiment of the present disclosure.

FIG. 2 is a flow diagram schematically illustrating a method for locating the specific autonomous vehicle in accordance with one example embodiment of the present disclosure, FIG. 3 is a drawing schematically illustrating the specific autonomous vehicle and an object within a certain distance from the specific autonomous vehicle in accordance with one example embodiment of the present disclosure, and FIG. 4 is a drawing schematically illustrating a difference between specific sensed data and actual object data in case a road has a slope in accordance with one example embodiment of the present disclosure.

Referring to FIG. 2, a method for locating a specific autonomous vehicle 310 may include a step S201 of receiving, by the computing device 100 of the specific autonomous vehicle 310, map data related to a position of the specific autonomous vehicle 310 and its adjacent regions.

Herein, the map data may be data related to driving paths, objects such as buildings, walls etc. around the driving paths in a form of polylines. Examples of the map data with the specific autonomous vehicle 310, a headed direction 311 of the specific autonomous vehicle 310, and an object 320 near the specific autonomous vehicle 310 are shown in FIG. 3.

Further, the adjacent regions are determined by referring to a certain distance from a position of the specific autonomous vehicle or by referring to a default criterion corresponding to the position of the specific autonomous vehicle. For example, one of the adjacent regions may be, but not limited to, a region within a radius of 50 m from the specific autonomous vehicle, an area visible from a specific sensor of the specific autonomous vehicle, or an area corresponding to at least part of an administrative region where the specific autonomous vehicle is located, etc. There may be various other examples for the adjacent regions as well.

And the method for locating the specific autonomous vehicle 310 may include a step S202 of obtaining, by the computing device 100, a specific object-based sector and a specific vehicle-based sector, by referring to (i) map object data regarding at least one object 320 included in the map data and (ii) specific sensed data obtained from a specific sensor 312 of the specific autonomous vehicle 310. The specific object-based sector and the specific vehicle-based sector would be explained later.

Herein, the specific sensor 312 may include at least one of: a vehicle speed sensor, a steering angle sensor, a position sensor, a lidar sensor, a radar sensor, and a camera for sensing information around the specific autonomous vehicle 310.

Meanwhile, the specific object-based sector may be a specific object-based virtual area, corresponding to a direction seen from the object 320 toward the position of the specific autonomous vehicle 310 and its adjacent directions, selected among all object-based virtual areas. Herein, all the object-based virtual areas are acquired by dividing surrounding areas of the object 320, e.g., into 8 equal sections with 45 degrees each, but is not limited thereto. The specific object-based sector may be one of the 8 equal sections corresponding to all the object-based virtual areas.

Likewise, the specific vehicle-based sector may be a specific vehicle-based virtual area, corresponding to a headed direction of the specific autonomous vehicle 310 and its adjacent directions, selected among all vehicle-based virtual areas. Herein, all the all vehicle-based virtual areas are acquired by dividing surrounding areas of the specific autonomous vehicle 310, e.g., into 8 equal sections with 45 degrees each, but is not limited thereto. The specific vehicle-based sector may be one of the 8 equal sections corresponding to all the vehicle-based virtual areas.

And the method for locating the specific autonomous vehicle 310 may include a step S203 of (i) determining a validity of the specific sensed data by referring to the specific object-based sector, the specific vehicle-based sector and the map object data, and (ii) in case the specific sensed data is determined as valid, locating the specific autonomous vehicle 310 by referring to a specific matched result data generated from a matching process between the map object data and the specific sensed data.

Referring to FIG. 4, when the specific sensor 312 detects the object 320 in case the road has a slope as shown in the left figure of FIG. 4, the object 320 sensed by the specific sensor 312 shown as a dashed line in the right figure of FIG. 4 may be inconsistent with the object in the map data shown as a solid line in the right figure of FIG. 4. The specific matched result data mentioned in the step of S203 may be data regarding a degree of this inconsistency. Using the specific matched result data may increase an accuracy of locating the specific autonomous vehicle 310 in various cases such as a road having a slope.

Herein, as a basis for determining the validity of the specific sensed data, (i) a specific minimum measured height and a specific maximum measured height of the object 320, measured by the specific sensor 312 of the specific autonomous vehicle 310 and (ii) a specific minimum measured distance and a specific maximum measured distance between the specific autonomous vehicle 310 and the object 320, measured by the specific sensor 312 of the specific autonomous vehicle 310, may further be referred to. Herein, it is to be noted that (i) the specific minimum measured height and the specific maximum measured height of the object 320 and (ii) the specific minimum measured distance and the specific maximum measured distance between the specific autonomous vehicle 310 and the object 320 correspond to a specific pair comprised of the specific object-based sector and the specific vehicle-based sector.

For example, a lowest point among the points in the right figure of FIG. 4 may be set as the minimum measured height, and a highest point among the points in the right figure of FIG. 4 may be set as the maximum measured height. Also, a distance between the specific autonomous vehicle 310 and a closest point among the points in the right figure of FIG. 4 may be set as the minimum measured distance, and a distance between the specific autonomous vehicle 310 and a furthest point among the points in the right figure of FIG. 4 may be set as the maximum measured distance.

Herein, the flow chart of FIG. 2 does not limit the method for locating the specific autonomous vehicle, and extra steps may be added to locate the specific autonomous vehicle as well.

Next, processes of determining the specific object-based sector and the specific vehicle-based sector will be explained by referring to FIGS. 5 and 6.

Figure 5:
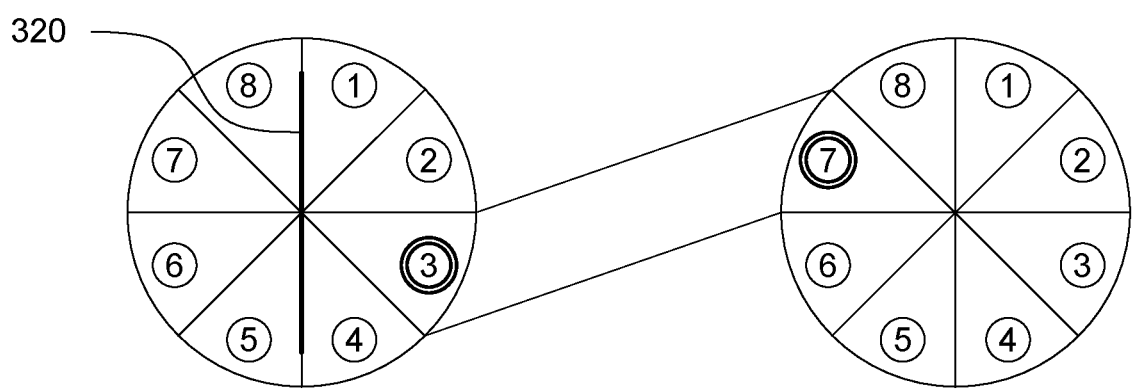
FIG. 5 is a drawing schematically illustrating (i) a 1-st object-based sector to an n-th object-based sector and (ii) a 1-st vehicle-based sector to an m-th vehicle-based sector in accordance with one example embodiment of the present disclosure.

FIG. 5 is a drawing schematically illustrating (i) a 1-st object-based sector to an n-th object-based sector and (ii) a 1-st vehicle-based sector to an m-th vehicle-based sector in accordance with one example embodiment of the present disclosure. According to FIG. 5, n and m are identically 8 but they are not limited thereto. For example, n and m may be different numbers as the case may be. Further, FIG. 6 is a drawing schematically illustrating processes of determining the specific object-based sector and the specific vehicle-based sector in accordance with one example embodiment of the present disclosure.

Referring to the left figure of FIG. 5, the 1-st object-based sector to the n-th object-based sector may be generated by assigning each of unit areas for each of directional ranges (45 degrees each) based on the object 320. In the example of FIG. 5, the 1-st object-based sector to the 8-th object-based sector are shown, but the number of the object-based sectors is not limited thereto. Referring to the right figure of FIG. 5, the 1-st vehicle-based sector to the m-th vehicle-based sector may be generated by assigning each of unit areas for each of directional ranges (45 degrees each) based on each of points on a road where the specific autonomous vehicle 310 has a possibility of being located during a driving of the specific autonomous vehicle 310. Likewise, in the example of FIG. 5, the 1-st vehicle-based sector to the 8-th vehicle-based sector are shown, but the number of the vehicle-based sectors is not limited thereto.

Herein, the step of generating (i) the 1-st object-based sector to the n-th object-based sector and (ii) the 1-st vehicle-based sector to the m-th vehicle-based sector may be performed before the step of S201.

Figure 6:
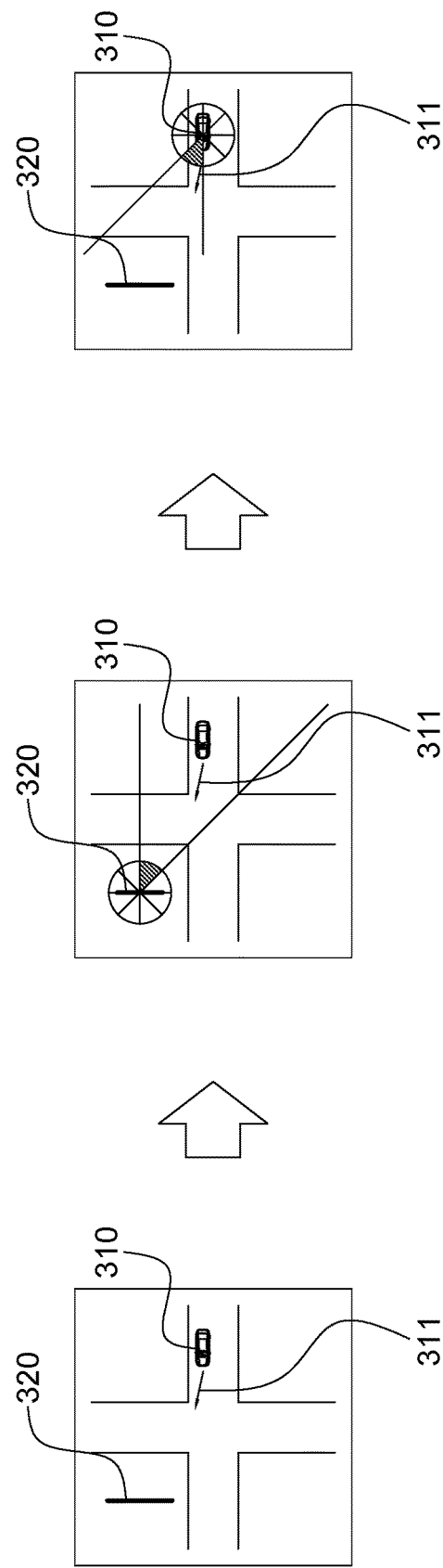
FIG. 6 is a drawing schematically illustrating processes of determining a specific object-based sector and a specific vehicle-based sector in accordance with one example embodiment of the present disclosure.

Next, FIG. 6 would be used for further explaining the determination of the specific object-based sector and the specific vehicle-based sector.

In the method for locating the specific autonomous vehicle 310 according to the present disclosure, one of the 1-st object-based sector to the n-th object-based sector may be determined as the specific object-based sector by referring to the direction seen from the object 320 toward the position of the specific autonomous vehicle 310, and one of the 1-st vehicle-based sector to the m-th vehicle-based sector may be determined as the specific vehicle-based sector by referring to the position of the specific autonomous vehicle 310 and the headed direction 311 of the specific autonomous vehicle 310.

For example, in the left figure of FIG. 6, the specific autonomous vehicle 310, the headed direction 311 and the object 320 are illustrated. Referring to the middle figure of FIG. 6, the 1-st object-based sector to the 8-th object-based sector are generated with a central point of the object 320 set as a center of the combined area of all the object-based sectors, and then the specific autonomous vehicle 310 is located in the 3-rd object-based sector among the 1-st object-based sector to the 8-th object-based sector. That is, the 3-rd object-based sector may be determined as the specific object-based sector. Further, referring to the right figure of FIG. 6, the 1-st vehicle-based sector to the 8-th vehicle-based sector are generated with a central point of the specific autonomous vehicle 310 set as a center of the combined area of all the vehicle-based sectors, and then the headed direction 311 is located in the 7-th vehicle-based sector among the 1-st vehicle-based sector to the 8-th vehicle-based sector. That is, the 7-th vehicle-based sector may be determined as the specific vehicle-based sector. The 3-rd object-based sector which is determined as the specific object-based sector and the 7-th vehicle-based sector which is determined as the specific vehicle-based sector are marked as black sectors in FIG. 5.

On the other hand, if the headed direction 311 is matched with a border between two adjacent vehicle-based sectors, one of the two adjacent vehicle-based sectors may be determined as the specific vehicle-based sector. As an example, in case the headed direction 311 is matched with the border between the 6-th vehicle-based sector and the 7-th vehicle-based sector, one of the 6-th vehicle-based sector and the 7-th vehicle-based sector may be determined as the specific vehicle-based sector.

However, as the case may be, information on each of the borders (i.e., total number of m borders including a border between the 1-st vehicle-based sector and the 2-nd vehicle-based sector, a border between the 2-nd vehicle-based sector and the 3-rd vehicle-based sector, . . . , a border between the m-th vehicle-based sector and the 1-st vehicle-based sector) may be additionally stored and managed for enhancing the accuracy of the matching process. As an example, information on a specific border between the 6-th vehicle-based sector and the 7-th vehicle-based sector may be provided as a matched line instead of any matched sector.

Such determination on the specific object-based sector and the specific vehicle-based sector may be performed at the step of S202.

Further, since each one is selected among the 1-st object-based sector to the n-th object-based sector and each one is selected among the 1-st vehicle-based sector to the m-th vehicle-based sector, n×m pairs can be considered according to all the combinations of {one object-based sector; one vehicle-based sector}. That is, the n×m pairs may include a (1_1)-st pair to an (n_m)-th pair. For example, since there are 8 object-based sectors and 8 vehicle-based sectors in FIGS. 5 and 6, there would be total of 64 pairs including the (1_1)-st pair to the (8_8)-th pair.

Also, previous matched data may be stored by correlating each of the previous matched data, between the object 320 and multiple previous vehicles driven within a certain distance from the object 320, with each of the (1_1)-st pair to the (n_m)-th pair. Herein, the previous matched data may include at least one of (i) previous minimum measured height(s) and previous maximum measured height(s) of the object 320, measured by previous sensors of the previous vehicles, (ii) previous minimum measured distance(s) and previous maximum measured distance(s) between the previous vehicles and the object 320, (iii) previous time length(s) which is a time section(s) when at least one of the previous vehicles is located within the certain distance from the object 320, (iv) the number of matched points between the previous sensor(s) and the map object data, and (v) an error(s) between the previous sensed data of the previous vehicle(s) and the map object data.

Herein, the error(s) between the previous sensed data of the previous vehicle(s) and the map object data may include at least one of a longitudinal error(s), a lateral error(s), a yaw angle error(s), a roll angle error(s), and a pitch angle error(s).

And, at the step of S203, the validity of the specific sensed data may be determined by further referring to the specific previous matched data, corresponding to the position and the headed direction 311 of the specific autonomous vehicle 310, among the previous matched data obtained from the multiple previous vehicles.

For example, in case the specific autonomous vehicle 310 corresponds to a (3_7)-th pair as shown in FIG. 6, previous matched data corresponding to a previous vehicle(s) which ran under the condition of the (3_7)-th pair is selected as (3_7)-th previous matched data, and then the validity of the specific sensed data may be determined by further referring to the (3_7)-th previous matched data.

And at the step of S203, the computing device 100 may receive at least one specific previous calibration value generated by referring to the specific previous matched data from the server, and locate the specific autonomous vehicle 310 by referring to the specific matched result data and the specific previous calibration value. Herein, locating the specific autonomous vehicle 310 may be performed by adding the specific previous calibration value to the specific matched result data, but it is not limited thereto.

Herein, the server may generate the specific previous calibration value by processing the previous matched data stored with respect to the specific pair corresponding to the specific autonomous vehicle 310 in a certain manner.

Figure 7:
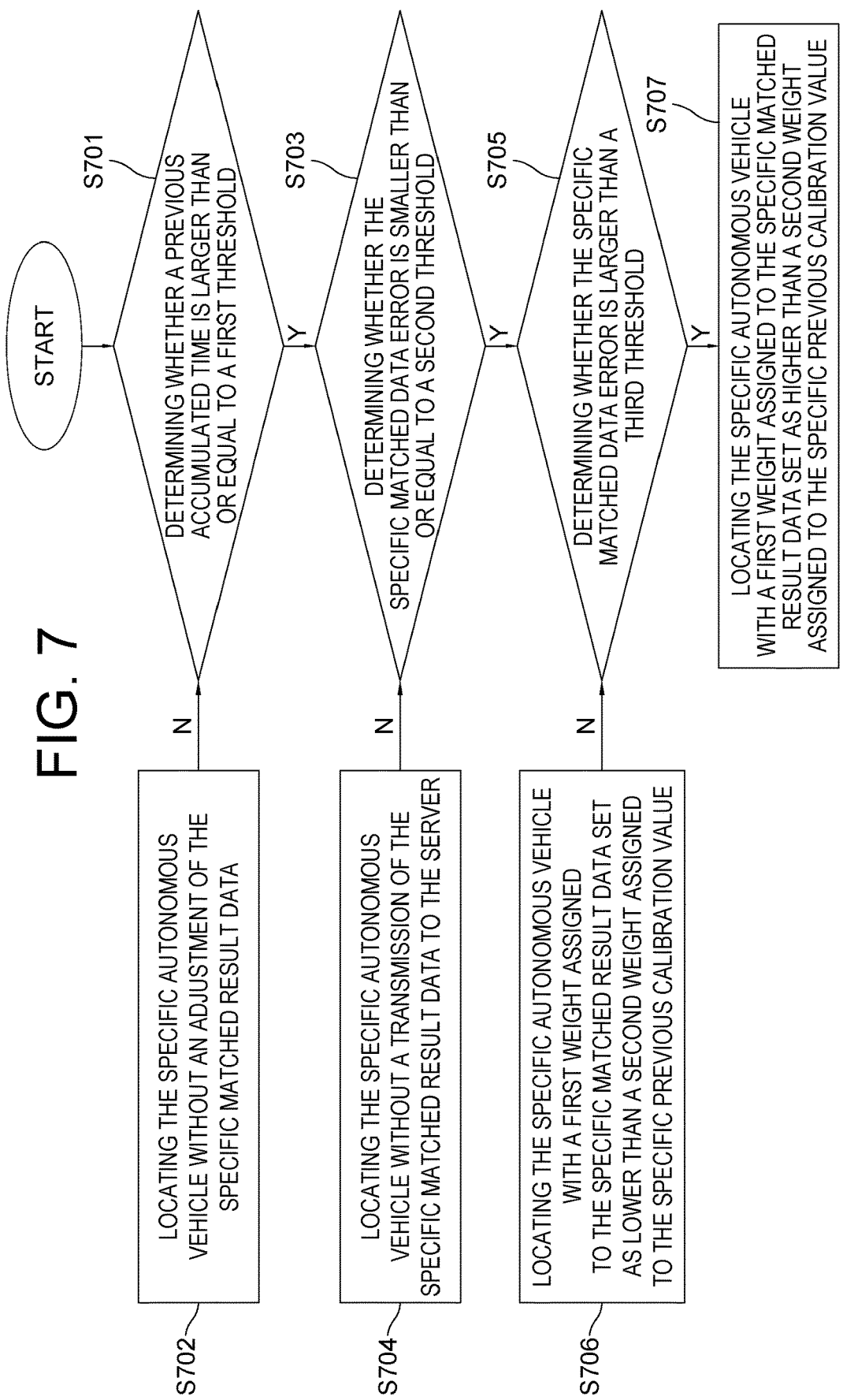
FIG. 7 is a flow diagram schematically illustrating processes of locating the specific autonomous vehicle by referring to a specific matched data error in accordance with one example embodiment of the present disclosure.

Next, FIG. 7 would be used for explaining the locating of the specific autonomous vehicle by referring to specific matched data error.

FIG. 7 is a flow diagram schematically illustrating processes of locating the specific autonomous vehicle by referring to the specific matched data error in accordance with one example embodiment of the present disclosure.

Referring to FIG. 7, the computing device 100 may determine whether a previous accumulated time is smaller than a 1-st threshold at a step of S701. Herein, the previous accumulated time is obtained by referring to a total time taken to obtain previous sensed data by the previous vehicle(s) under a condition of the specific pair comprised of the specific object-based sector and the specific vehicle-based sector.

In case the previous accumulated time is smaller than the 1-st threshold, the computing device 100 may locate the specific autonomous vehicle 310 without an adjustment of the specific matched result data at a step of S702.

This means that an amount of the previous matched data stored with respect to the specific pair corresponding to the specific autonomous vehicle 310 is insufficient, so that the specific previous matched data cannot be obtained in this case. Thus, the computing device 100 may locate the specific autonomous vehicle 310 by only using the specific matched result data (which is not previous data). The specific matched result data would be uploaded to the server, and at a later time may be used as the previous matched data for another autonomous vehicle which will be driving at a region of the specific pair later.

Meanwhile, in case the previous accumulated time is larger than or equal to the 1-st threshold, the computing device 100 may determine whether the specific matched data error is smaller than or equal to a 2-nd threshold (S703). If the specific matched data error is determined not to be smaller than or equal to the 2-nd threshold (i.e., the specific matched data error is determined to be larger than the 2-nd threshold), the computing device 100 determines that the object 320 is not recognizable for the specific pair comprised of the specific object-based sector and the specific vehicle-based sector, and thus locates the specific autonomous vehicle 310 without a transmission of the specific matched result data to the server at a step of S704.

That means that the specific autonomous vehicle 310 has completely failed to detect the object 320 even if the specific matched data error is referred to. Thus, in this case, the computing device 100 locates the specific autonomous vehicle 310 with only the specific matched result data. Since the specific matched result data is not related to the detection of the object 320 at all, the specific matched result data would not be uploaded to the server.

Meanwhile, in case the specific matched data error is smaller than or equal to the 2-nd threshold, the computing device 100 may determine whether the specific matched data error is larger than a 3-rd threshold at a step of S705. Herein, the 3-rd threshold may be smaller than the 2-nd threshold.

In case a 1-st weight may be determined as a weight assigned to the specific matched result data and a 2-nd weight may be determined as a weight assigned to the specific previous calibration value, then if the specific matched data error is determined as being larger than the 3-rd threshold, the computing device 100 locates the specific autonomous vehicle 310 with the 1-st weight set as lower than the 2-nd weight at a step of S706.

That is, in case the specific matched data error is determined as being larger than the 3-rd threshold, the specific matched result data (corresponding to the sensed data obtained by the specific autonomous vehicle) is determined to be less reliable compared to the specific previous calibration value(s) (corresponding to the sensed data obtained by the previous vehicle(s)). Thus, the specific previous calibration value is more reflected on locating the specific autonomous vehicle 310 than the specific matched result data.

On the other hand, in case the specific matched data error is determined as being smaller than or equal to the 3-rd threshold, the computing device 100 locates the specific autonomous vehicle 310 with the 1-st weight set as higher than the 2-nd weight at a step of S707. Thus, the specific matched result data is more reflected on locating the specific autonomous vehicle 310 than the specific previous calibration value.

And the specific sensed data may include at least one of (i) a specific minimum measured height and a specific maximum measured height of the object 320, measured by the specific sensor 312 of the specific autonomous vehicle 310, (ii) a specific minimum measured distance and a specific maximum measured distance between the specific autonomous vehicle 310 and the object 320, (iii) a specific time length which is a time section when the specific autonomous vehicle 310 is located within a certain distance from the object 320, and (iv) the number of matched points between the specific sensor and the map object data.

Herein, the specific sensed data may further include posture information of the specific autonomous vehicle 310. Herein, the posture information may include at least one of a yaw angle, a roll angle, and a pitch angle. If the specific sensed data includes the posture information of the specific autonomous vehicle 310, a yaw angle error, a roll angle error, and a pitch angle error for the specific autonomous vehicle 310 may be obtained. Then, the yaw angle error, the roll angle error, and the pitch angle error for the specific autonomous vehicle 310 may be compared to previous yaw angle error(s), previous roll angle error(s), and previous pitch angle error(s) of the previous vehicle(s) in order to determine the validity of the specific sensed data to be used for locating the specific autonomous vehicle 310.

The present disclosure has an effect of obtaining the specific object-based sector and the specific vehicle-based sector by referring to (i) the map object data regarding at least one object included in the map data and (ii) the specific sensed data obtained from the specific sensor of the specific autonomous vehicle and to determine the validity of the specific sensed data by using the specific object-based sector and the specific vehicle-based sector, to thereby locate the specific autonomous vehicle.

The present disclosure has another effect of locating the specific autonomous vehicle with the 1-st weight set as lower than the 2-nd weight in case the specific matched data error, obtained by referring to the difference between the specific sensed data and the map object data, is determined as being larger than the 2-nd threshold, and locating the specific autonomous vehicle with the 1-st weight set as larger than the 2-nd weight in case the specific matched data error is determined as being equal to or smaller than the 2-nd threshold, under a circumstance that a previous accumulated time, obtained by referring to a total time taken to obtain the previous sensed data by the previous vehicle(s) for the specific pair comprised of the specific object-based sector and the specific vehicle-based sector, is sufficient.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for locating a specific autonomous vehicle, comprising steps of:
    (a0) generating a 1-st object-based sector to an n-th object-based sector by assigning each of unit areas for each of directional ranges based on the object, and generating a 1-st vehicle-based sector to an m-th vehicle-based sector by assigning each of unit areas for each of directional ranges based on each of points on a road where the specific autonomous vehicle has a possibility of being located during a driving of the specific autonomous vehicle;
    (a) receiving, by a computing device of the specific autonomous vehicle, map data related to a position of the specific autonomous vehicle and its adjacent regions, from a server, wherein the map data comprises polylines;
    (b) obtaining, by the computing device, a specific object-based sector and a specific vehicle-based sector, by referring to (i) map object data regarding at least one object included in the map data, wherein the map object data includes polylines, and (ii) specific sensed data obtained from a specific sensor of the specific autonomous vehicle, wherein the specific object-based sector is a specific object-based virtual area, corresponding to a direction seen from the object toward the position of the specific autonomous vehicle and its adjacent directions, selected among all object-based virtual areas, and wherein the specific vehicle-based sector is a specific vehicle-based virtual area, corresponding to a headed direction of the specific autonomous vehicle and its adjacent directions, among all vehicle-based virtual areas, wherein one of the 1-st object-based sector to the n-th object-based sector is determined as the specific object-based sector by referring to the direction seen from the object toward the position of the specific autonomous vehicle, and one of the 1-st vehicle-based sector to the m-th vehicle-based sector is determined as the specific vehicle-based sector by referring to the position of the specific autonomous vehicle and the headed direction of the specific autonomous vehicle; and (c) determining, by the computing device, a validity of the specific sensed data by referring to the specific object-based sector, the specific vehicle-based sector and the map object data, and in case the specific sensed data is determined as valid, locating the specific autonomous vehicle by referring to a specific matched result data generated from a matching process between the map object data and the specific sensed data.

2. The method of claim 1, wherein, at the step of (c), the computing device determines the validity of the specific sensed data by further referring to (i) a specific minimum measured height and a specific maximum measured height of the object, measured by the specific sensor of the specific autonomous vehicle and (ii) a specific minimum measured distance and a specific maximum measured distance between the specific autonomous vehicle and the object, measured by the specific sensor of the specific autonomous vehicle, and wherein (i) the specific minimum measured height and the specific maximum measured height of the object and (ii) the specific minimum measured distance and the specific maximum measured distance between the specific autonomous vehicle and the object correspond to a specific pair comprised of the specific object-based sector and the specific vehicle-based sector.

3. The method of claim 1, before the step of (a), further comprising steps of:
(a1) taking all combinations by selecting each one among the 1-st object-based sector to the n-th object-based sector and selecting each one among the 1-st vehicle-based sector to the m-th vehicle-based sector, thereby generating n×m pairs including a (1_1)-st pair to an (n_m)-th pair, and
(a2) storing previous matched data by correlating each of the previous matched data, between the object and multiple previous vehicles driven within a certain distance from the object, with each of the (1_1)-st pair to the (n_m)-th pair.

4. The method of claim 3, wherein, at the step of (c), the validity of the specific sensed data is determined by further referring to specific previous matched data, corresponding to a specific point on the road and matching to the position and the headed direction of the specific autonomous vehicle, among the previous matched data obtained from the multiple previous vehicles.

5. The method of claim 4, wherein, at the step of (c), the computing device receives at least one specific previous calibration value generated by referring to the specific previous matched data from the server, and locating the specific autonomous vehicle by referring to the previous matched data and the previous calibration value.

6. The method of claim 5, wherein, at the step of (c), in case a previous accumulated time, obtained by referring to a total time taken to obtain previous sensed data by the previous vehicle under a condition of a specific pair comprised of the specific object-based sector and the specific vehicle-based sector, is determined to be smaller than a 1-st threshold, the computing device locates the specific autonomous vehicle without an adjustment of the specific matched result data.

7. The method of claim 5, wherein, at the step of (c), in case a previous accumulated time, obtained by referring to a total time taken to obtain previous sensed data by the previous vehicle under a condition of a specific pair comprised of the specific object-based sector and the specific vehicle-based sector, is determined to be larger than or equal to a 1-st threshold and in case a specific matched data error, obtained by referring to a difference between the specific sensed data and the map object data, is determined as being larger than a 2-nd threshold, the computing device determines that the object is not recognizable for the specific pair comprised of the specific object-based sector and the specific vehicle-based sector, and locates the specific autonomous vehicle without a transmission of the specific matched result data to the server.

8. The method of claim 7, wherein, at the step of (c), on condition that a previous accumulated time, obtained by referring to the total time taken to obtain previous sensed data by the previous vehicle under the condition of the specific pair comprised of the specific object-based sector and the specific vehicle-based sector, is determined to be larger than or equal to the 1-st threshold, (i) in case the specific matched data error, obtained by referring to the difference between the specific sensed data and the map object data, is determined as being larger than a 3-rd threshold and smaller than or equal to the 2-nd threshold, the computing device locates the specific autonomous vehicle with a 1-st weight set as lower than a 2-nd weight, and (ii) in case the specific matched data error is equal to or smaller than the 3-rd threshold, the computing device locates the specific autonomous vehicle with the 1-st weight set as higher than the 2-nd weight, wherein the 1-st weight is a weight assigned to the specific matched result data and the 2-nd weight is a weight assigned to the specific previous calibration value.

9. The method of claim 1, wherein, at the step of (c), the specific sensed data includes: (i) a specific minimum measured height and a specific maximum measured height of the object, measured by the specific sensor of the specific autonomous vehicle, (ii) a specific minimum measured distance and a specific maximum measured distance between the specific autonomous vehicle and the object, (iii) a specific time length which is a time section when the specific autonomous vehicle is located within a certain distance from the object, and (iv) a number of matched points between the specific sensor and the map object data.

10. A computing device for locating a specific autonomous vehicle, comprising:
at least one memory that stores instructions; and
at least one processor configured to execute the instructions to perform or support another device to perform the steps of:
generating a 1-st object-based sector to an n-th object-based sector by assigning each of unit areas for each of directional ranges based on the object, and generating a 1-st vehicle-based sector to an m-th vehicle-based sector by assigning each of unit areas for each of directional ranges based on each of points on a road where the specific autonomous vehicle has a possibility of being located during a driving of the specific autonomous vehicle;
receiving map data related to a position of the specific autonomous vehicle and its adjacent regions, from a server, wherein the map data comprises polylines;
obtaining a specific object-based sector and a specific vehicle-based sector, by referring to (i) map object data regarding at least one object included in the map data, wherein the map object data includes polylines, and (ii) specific sensed data obtained from a specific sensor of the specific autonomous vehicle, wherein the specific object-based sector is a specific object-based virtual area, corresponding to a direction seen from the object toward the position of the specific autonomous vehicle and its adjacent directions, selected among all object-based virtual areas, and wherein the specific vehicle-based sector is a specific vehicle-based virtual area, corresponding to a headed direction of the specific autonomous vehicle and its adjacent directions, among all vehicle-based virtual areas, wherein one of the 1-st object-based sector to the n-th object-based sector is determined as the specific object-based sector by referring to the direction seen from the object toward the position of the specific autonomous vehicle, and one of the 1-st vehicle-based sector to the m-th vehicle-based sector is determined as the specific vehicle-based sector by referring to the position of the specific autonomous vehicle and the headed direction of the specific autonomous vehicle; and determining a validity of the specific sensed data by referring to the specific object-based sector, the specific vehicle-based sector and the map object data, and in case the specific sensed data is determined as valid, locating the specific autonomous vehicle by referring to a specific matched result data generated from a matching process between the map object data and the specific sensed data.

11. The computing device of claim 10, wherein, the processor determines the validity of the specific sensed data by further referring to (i) a specific minimum measured height and a specific maximum measured height of the object, measured by the specific sensor of the specific autonomous vehicle and (ii) a specific minimum measured distance and a specific maximum measured distance between the specific autonomous vehicle and the object, measured by the specific sensor of the specific autonomous vehicle, and wherein (i) the specific minimum measured height and the specific maximum measured height of the object and (ii) the specific minimum measured distance and the specific maximum measured distance between the specific autonomous vehicle and the object correspond to a specific pair comprised of the specific object-based sector and the specific vehicle-based sector.

12. The computing device of claim 10, wherein, before receiving the map data, the processor further performs processes of: taking all combinations by selecting each one among the 1-st object-based sector to the n-th object-based sector and selecting each one among the 1-st vehicle-based sector to the m-th vehicle-based sector, thereby generating n×m pairs including a (1_1)-st pair to an (n_m)-th pair, and storing previous matched data by correlating each of the previous matched data, between the object and multiple previous vehicles driven within a certain distance from the object, with each of the (1_1)-st pair to the (n_m)-th pair.

13. The computing device of claim 12, wherein the validity of the specific sensed data is determined by further referring to specific previous matched data, corresponding to a specific point on the road and matching to the position and the headed direction of the specific autonomous vehicle, among the previous matched data obtained from the multiple previous vehicles.

14. The computing device of claim 13, wherein the processor receives at least one specific previous calibration value generated by referring to the specific previous matched data from the server, and locating the specific autonomous vehicle by referring to the previous matched data and the previous calibration value.

15. The computing device of claim 14, wherein in case a previous accumulated time, obtained by referring to a total time taken to obtain previous sensed data by the previous vehicle under a condition of a specific pair comprised of the specific object-based sector and the specific vehicle-based sector, is determined to be smaller than a 1-st threshold, the processor locates the specific autonomous vehicle without an adjustment of the specific matched result data.

16. The computing device of claim 14, wherein in case a previous accumulated time, obtained by referring to a total time taken to obtain previous sensed data by the previous vehicle under a condition of a specific pair comprised of the specific object-based sector and the specific vehicle-based sector, is determined to be larger than or equal to a 1-st threshold and in case a specific matched data error, obtained by referring to a difference between the specific sensed data and the map object data, is determined as being larger than a 2-nd threshold, the processor determines that the object is not recognizable for the specific pair comprised of the specific object-based sector and the specific vehicle-based sector, and locates the specific autonomous vehicle without a transmission of the specific matched result data to the server.

17. The computing device of claim 16, wherein, on condition that a previous accumulated time, obtained by referring to the total time taken to obtain previous sensed data by the previous vehicle under the condition of the specific pair comprised of the specific object-based sector and the specific vehicle-based sector, is determined to be larger than or equal to the 1-st threshold, (i) in case the specific matched data error, obtained by referring to the difference between the specific sensed data and the map object data, is determined as being larger than a 3-rd threshold while smaller than or equal to the 2-nd threshold, the processor locates the specific autonomous vehicle with a 1-st weight set as lower than a 2-nd weight, and (ii) in case the specific matched data error is equal to or smaller than the 3-rd threshold, the processor locates the specific autonomous vehicle with the 1-st weight set as higher than the 2-nd weight, wherein the 1-st weight is a weight assigned to the specific matched result data and the 2-nd weight is a weight assigned to the specific previous calibration value.

18. The computing device of claim 10, wherein the specific sensed data includes: (i) a specific minimum measured height and a specific maximum measured height of the object, measured by the specific sensor of the specific autonomous vehicle, (ii) a specific minimum measured distance and a specific maximum measured distance between the specific autonomous vehicle and the object, (iii) a specific time length which is a time section when the specific autonomous vehicle is located within a certain distance from the object, and (iv) a number of matched points between the specific sensor and the map object data.

* * * * *